US008108864B2

(12) United States Patent
Alimi et al.

(10) Patent No.: US 8,108,864 B2
(45) Date of Patent: Jan. 31, 2012

(54) METHOD AND SYSTEM FOR DYNAMICALLY TRACKING ARBITRARY TASK DEPENDENCIES ON COMPUTERS IN A GRID ENVIRONMENT

(75) Inventors: Richard A. Alimi, Simsbury, CT (US); Richard P. Alther, Woodbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 11/757,303

(22) Filed: Jun. 1, 2007

(65) Prior Publication Data

US 2008/0301642 A1 Dec. 4, 2008

(51) Int. Cl.
*G06F 9/46* (2006.01)
*G06F 11/00* (2006.01)
*G06F 15/16* (2006.01)
*G06F 15/173* (2006.01)

(52) U.S. Cl. ........ 718/102; 709/201; 709/203; 709/223; 709/224; 714/1; 714/2

(58) Field of Classification Search .................... 718/102
See application file for complete search history.

(56) References Cited

U.S. PATENT DOCUMENTS

| 6,055,363 | A | 4/2000 | Beals et al. | |
|---|---|---|---|---|
| 2004/0215590 | A1* | 10/2004 | Kroening | 707/1 |
| 2004/0225711 | A1 | 11/2004 | Burnett et al. | |
| 2005/0027863 | A1 | 2/2005 | Talwar et al. | |
| 2005/0283786 | A1* | 12/2005 | Dettinger et al. | 718/104 |
| 2006/0020939 | A1 | 1/2006 | Fellenstein et al. | |
| 2006/0048157 | A1 | 3/2006 | Dawson et al. | |
| 2006/0075407 | A1* | 4/2006 | Powers et al. | 718/100 |
| 2006/0150157 | A1* | 7/2006 | Fellenstein et al. | 717/126 |
| 2006/0179171 | A1* | 8/2006 | Stefaniak et al. | 710/15 |
| 2006/0184626 | A1 | 8/2006 | Agapi et al. | |
| 2006/0212333 | A1 | 9/2006 | Jackson | |
| 2006/0230405 | A1 | 10/2006 | Fraenkal et al. | |
| 2007/0143762 | A1* | 6/2007 | Arnold et al. | 718/103 |

* cited by examiner

*Primary Examiner* — Jennifer To
(74) *Attorney, Agent, or Firm* — Cahn & Samuels, LLP

(57) ABSTRACT

A method, system and computer program product for tracking arbitrary task dependencies on computers in a grid environment including the steps of downloading a task to a computer coupled to the grid and identifying the dependencies necessary to perform the task and downloading the dependency executables to check the dependencies on the computer, and executing the downloaded dependency executables on the computer. When the dependencies are satisfied, executing the task on the computer and returning the results of the task to the grid server. When at least one of the dependencies are checked and are not satisfied on the computer, returning an error for the task to the grid server, recording the particular dependencies that failed as not satisfied for the computer, and recording a timestamp indicating when the dependency was checked. Assigning a task to a particular computer coupled to the grid if there are no recorded failed dependencies required for the task associated with the computer or the timestamp associated with a recorded dependency failure is of a predetermined age.

12 Claims, 4 Drawing Sheets

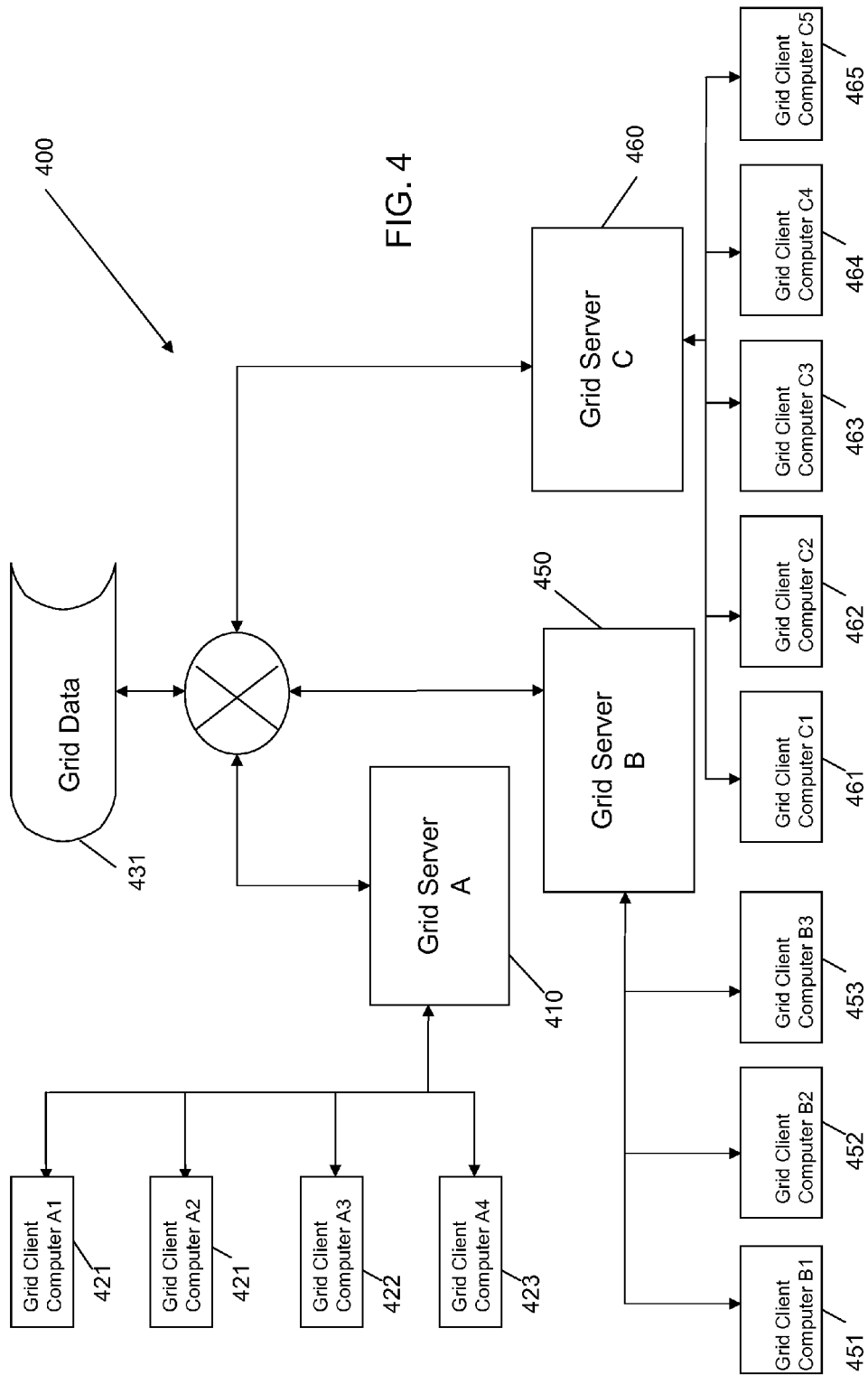

METHOD AND SYSTEM FOR DYNAMICALLY TRACKING ARBITRARY TASK DEPENDENCIES ON COMPUTERS IN A GRID ENVIRONMENT

I. FIELD OF THE INVENTION

This invention relates in general to the field of computer systems and efficient task distribution and in particular to the field of tracking arbitrary task dependencies on computers in a grid environment.

II. DESCRIPTION OF THE PRIOR ART

Grid computing refers generally to a computation network including tools and protocols for coordinated resource sharing and problem solving among pooled resources. These pooled assets can be connected to a local network or distributed across the globe. Traditionally, grid environments allow large computational tasks to be distributed among the computers attached to the grid and thus completed much faster than if they were executed by a single computer. Current grid environments such as "BOINC," the Berkley Open Infrastructure for Network Computing, and United Devices's "Grid MP" product implement this functionality. Tasks are usually comprised of a set of binaries and a set of input files. The binaries are specific to the operating system and CPU architecture of the client machine that is to execute the task. These current environments distribute to a computer the binaries for the correct operating system and CPU architecture.

Existing environments only track a fixed set of common information, or dependencies, about each device. The use of fixed sets of dependencies greatly limits the solutions available to an operator for efficiently assigning tasks to client computers in a grid environment. One such limitation is how tasks are assigned in view of a previous unsuccessful attempt to execute a task. Problems arise when a grid server continues to assign a task to a client computer that is incapable of successfully executing the assigned task. Time and resources are wasted in continued attempts to assign a task to a client computer unable to successful execute that particular task. Due to this limitation, current grid environments are generally not used for tasks requiring specialized dependencies.

BOINC uses a threshold to address the problem of failed tasking. Specifically, once a task fails on a client computer a certain number of times that machine is taken off the grid as a client computer and will not be assigned any task for a period of time. This has the effect of reducing the computing power available to the grid for other tasks by one machine.

United Devices's "Grid MP" uses a manual process to address the problem of unsuccessful task distribution. Specifically, when tasks fail repeatedly, human intervention is required to configure the grid server not to schedule further tasks for that machine. Likewise, manual intervention is required to re-enable the client to start receiving tasks again.

Current grid environments are unable to track arbitrary information about each grid device; they only track enough information to distribute the correct binaries to each device. Thus, tasks that require specialized dependencies, for example dependencies other than a particular operating system or architecture, are generally not considered in current grid systems.

III. SUMMARY OF THE INVENTION

If a grid environment were able to track arbitrary information (e.g., the version of Java installed on the device or the state of some system configuration option) about each device, the grid would be able to distribute tasks tailored for a specific computer or class of machines.

The ability to use other information about the client machines or system to determine task assignments would make the grid more efficient, robust, and flexible in a dynamic environment. The need for human operator supervision would be reduced, and the computational resources of the grid could be preserved, even in view of a failed task assignment.

Disclosed is a method of tracking arbitrary task dependencies on computers in a grid environment including the steps of downloading a task to a computer coupled to the grid and identifying the dependencies necessary to perform the task. Downloading the dependency executables to check the dependencies on the computer, and executing the downloaded dependency executables on the computer. When the dependencies are satisfied, executing the task on the computer, returning the results of the task to the grid server.

When at least one of the dependencies are checked and are not satisfied on the computer, returning an error for the task to the grid server, recording the particular dependencies that failed as not satisfied for the computer, and recording a timestamp indicating when the dependency was checked.

Assigning a task to a particular computer coupled to the grid if there are no recorded failed dependencies required for the task associated with the computer, or the timestamp associated with a recorded dependency failure is of a predetermined age.

Also disclosed is a system for tracking arbitrary task dependencies on a computer coupled to a grid network having a plurality of client computers coupled to at least one grid server computer such that at least one of the client computers can receive task from at least one grid server. A memory device is coupled to the grid server computer. At least one grid server evaluates a candidate task for a client computer selected from the plurality of client computers, and identifies the dependencies necessary to perform the task. The selected client computer downloads a task from the grid server, downloads the dependency executables identified by the grid server to check the dependencies on the selected client computer and executes the downloaded dependency executables.

When the dependencies are satisfied, the selected client computer executes the assigned task. When at least one of the dependencies is checked and is not satisfied, the selected client computer returns an error for the task to the grid server, and the grid server records the particular dependencies that failed as not satisfied for the selected client computer with a timestamp indicating when the dependency was checked. The grid server assigns a task to a particular client computer coupled to the grid if there are no recorded failed dependencies required for the task associated with the client computer, or the timestamp associated with a recorded dependency failure is of a predetermined age.

Also disclosed is a computer program product comprising computer-usable medium having; a computer-usable program code for tracking arbitrary dependencies in a grid environment. The computer program product has computer-usable program code for downloading a task to a computer coupled to the grid; computer-usable program code for identifying the dependencies necessary to perform the task; computer-usable program code for downloading the dependency executables to check the dependencies on the computer, and computer-usable program code for executing the downloaded dependency executables on the computer.

When the dependencies are satisfied, the computer-usable code executes the task on the computer, and returns the results of the task to the grid server.

When at least one of the dependencies are checked and are not satisfied on the computer, the computer-usable program code returns an error for the task to the grid server, and records the particular dependencies that failed as not satisfied for the computer with a timestamp indicating when the dependency was checked. The computer-usable program code assigns a task to a particular computer coupled to the grid if there are no recorded failed dependencies required for the task associated with the computer or the timestamp associated with a recorded dependency failure is of a predetermined age.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 4 illustrates a block diagram of an exemplary grid architecture featuring multiple servers and multiple client computers according to the invention.

V. DETAILED DESCRIPTION

Various embodiments are discussed in detail below. While specific implementations of the disclosed technology are discussed, it should be understood that this is done for illustration purposes only. A person skilled in the relevant art will recognize that other components and configurations may be used without departing from the spirit and scope of the invention.

This disclosure relates to the tracking of arbitrary task dependencies on computers in a grid environment including the steps of downloading a task to a computer coupled to the grid and identifying the dependencies necessary to perform the task. "Arbitrary" as used in this text, means any property or feature that can be checked for or detected by a computer program. A "Dependency executable" is a computer program whose function is to check for or detect the presence of a particular dependency.

Figure 1:
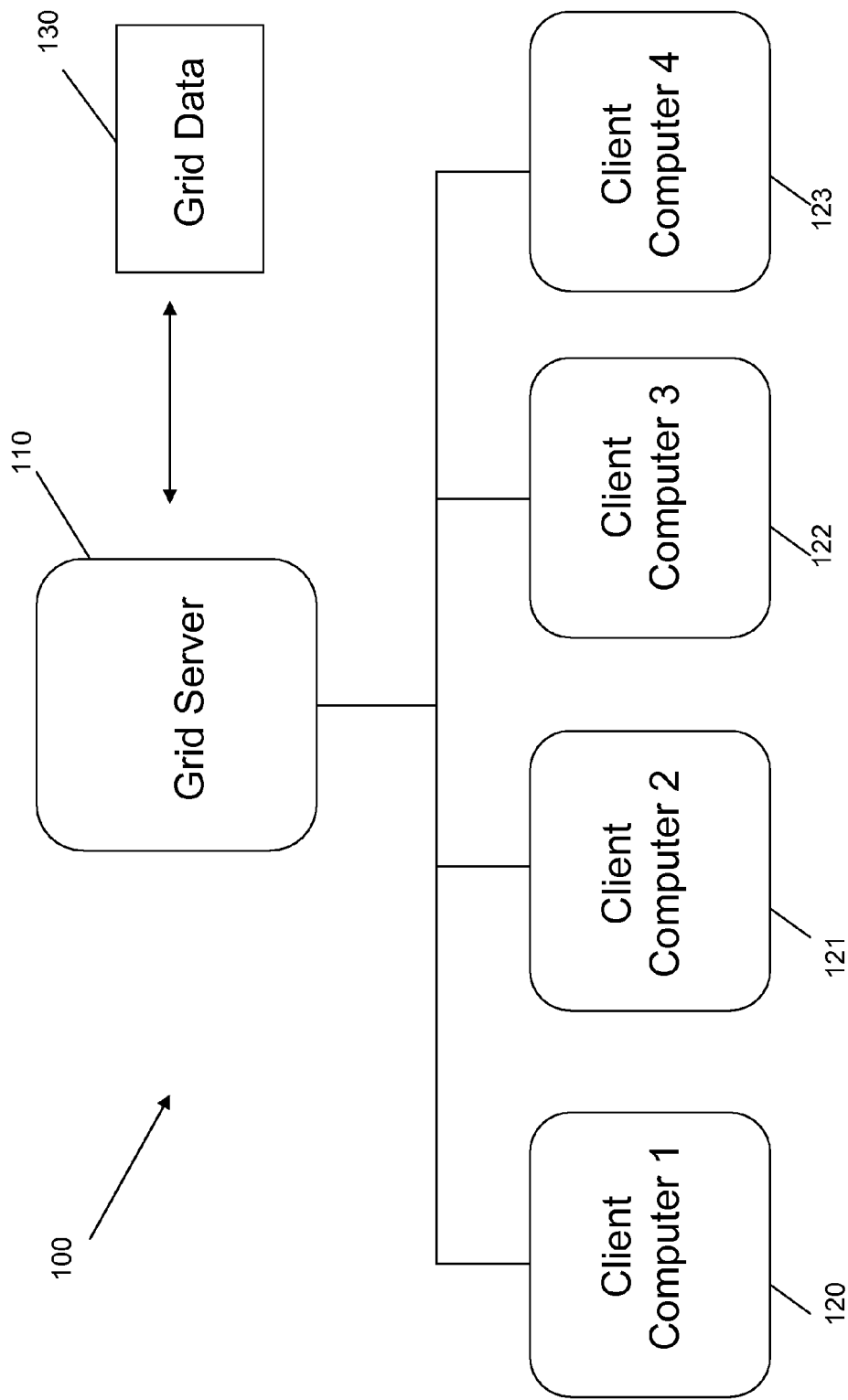
FIG. 1 illustrates a block diagram of an exemplary network structure featuring a single grid server and multiple client computers according to the invention.

Referring now to the figures, wherein like reference number denote like components, elements, or features, FIG. 1 illustrates a block diagram of an exemplary network structure 100 featuring a single grid server and multiple client computers. Grid server 110 is coupled to a plurality of client computers 120, 121, 122 and 123 such that each client machine is capable of independently receiving and transmitting data to grid server 110.

Grid server 110 is further coupled to a means for storing grid data 130. The means for storing grid data 130 is not a limiting feature of this technology and can be in the form of hardware, firmware, software or a combination thereof. The means for storing grid data 130 can be housed in a common box or structure with grid server 110, or external from the grid server 110 in close proximity or at a remote location. In a preferred embodiment, the grid server 110 has unencumbered access to the grid data 130 and can store and retrieve grid data efficiently.

Figure 2:
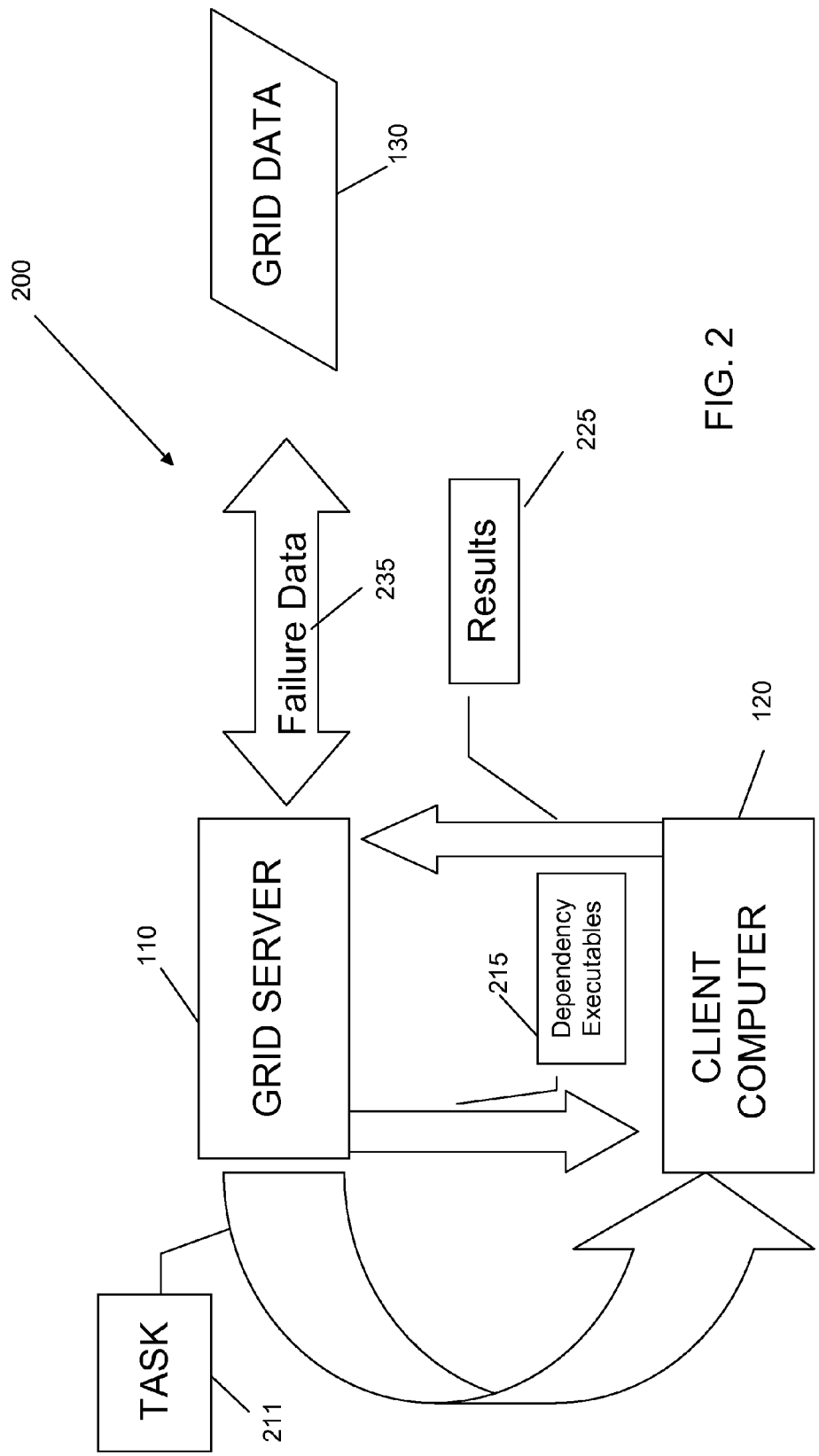
FIG. 2 illustrates a block diagram of an example system for tracking arbitrary task dependencies on computers in a grid environment according to the invention.

FIG. 2 illustrates a block diagram of an example system for tracking arbitrary task dependencies on computers in a grid environment. Referring now to FIG. 2 with continued reference to FIG. 1, grid server 110 has a particular task to be distributed to one of the plurality of client machines 120, 121, 122, 123 coupled to grid server 110. Grid server 110 employs a scheduling algorithm to make an initial selection of a client computer 120 from the plurality of client computers coupled to grid server 110 to assign the task. Grid server 110 evaluates the candidate task for client computer 120 selected from the plurality of client computers and identifies the dependencies necessary to perform that particular task on selected client computer 120.

Client computer 120, downloads the dependency executables identified 215 by the grid server 110 to check for the dependencies on the selected client computer. The client computer accomplishes this exercise by running the dependency executables. If all the dependencies are found to be present, client computer 120 executes the assigned task 211 and returns the results 225 to grid server 110.

When all the dependencies necessary to complete a task are not found to be present in the selected client computer 120, client computer 120 sends an error message to grid server 110 that indicates the dependencies that were not satisfied on the selected client computer. Grid server 110 then records the failure data and current timestamp for later retrieval. In a preferred embodiment, the failure data is recorded and tracked in a grid database 130 and the grid server 110 may refer to the previously collected failure data contained in the grid database 130 prior to assigning subsequent tasks.

The disclosed invention can take the form of an entirely hardware embodiment, an entirely software embodiment or an embodiment containing both hardware and software elements. In at least one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory, (CD-ROM), compact disk-read/write (CD-R/W) and DVD.

A data processing system suitable for storing and/or executing program code will include at least one processor coupled directly or indirectly to memory elements through a system bus. The memory elements can include a local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
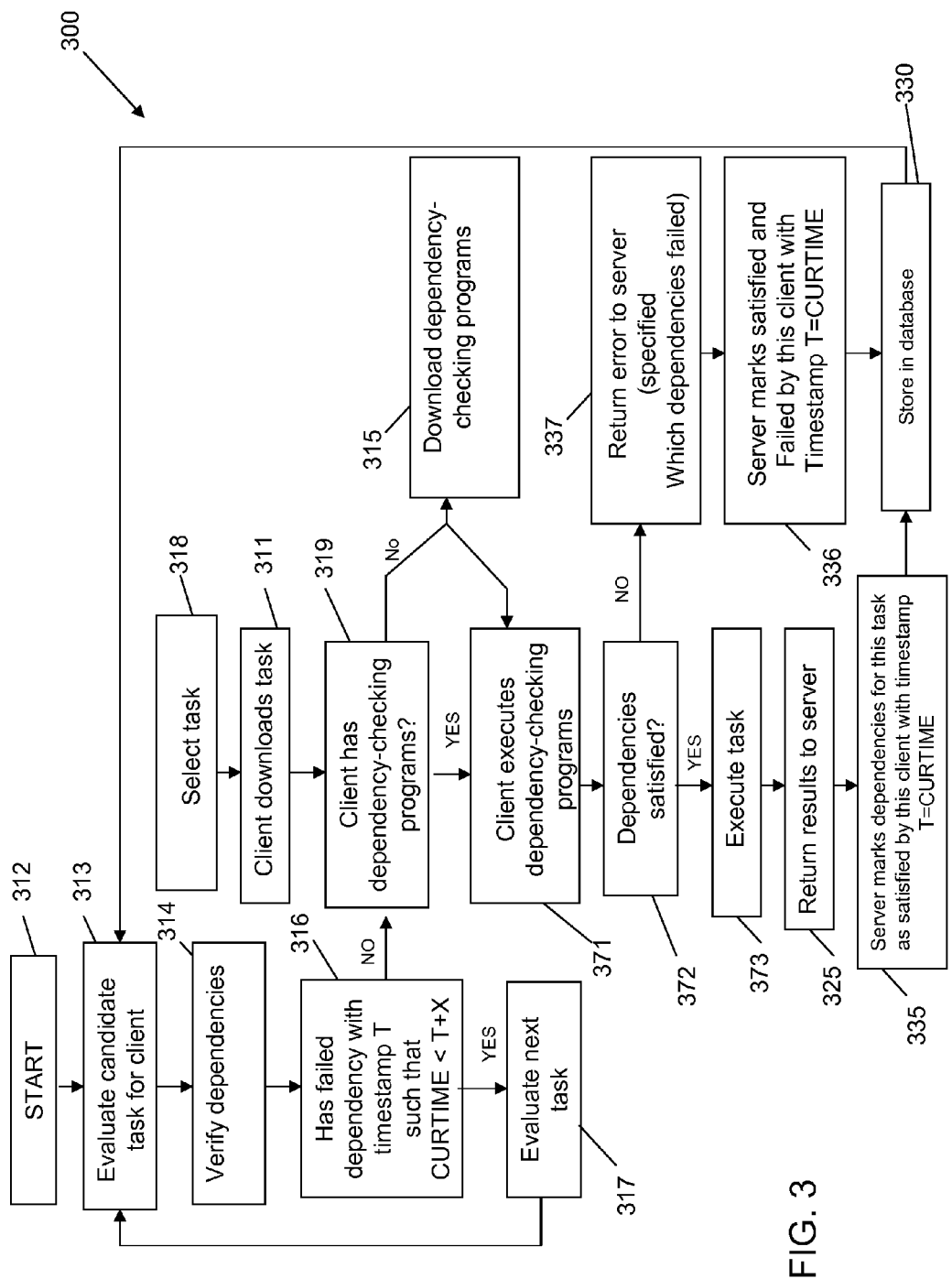
FIG. 3 illustrates a flowchart of an example method for tracking arbitrary task dependencies on computers in a grid environment according to the invention.

FIG. 3 illustrates a flowchart 300 of an example method for tracking arbitrary task dependencies on computers in a grid environment. The Start block 312 represents the initial conditions of the method. Initially, grid database 130 contains either no failure data or old failure data. Also, the user, client or administrator may provide static data or rules by which the data is evaluated. Also, a task originates in the conditions represented in start block 312.

In block 313 the grid server evaluates a candidate task for the client machine. If there is dependency data stored in the grid database, this information is retrieved by the grid server and used for the dependency comparison culminating in the dependency decision of block 316. The grid server begins by verifying the dependencies necessary to successfully complete the task as shown in block 314.

Block 316 is the dependency decision block. Each piece of information in the dependency database is associated with a timestamp, indicating when that particular piece of dependency information was created or updated. The grid server refers to the dependency database and retrieves any relevant grid data therefrom. When the dependency data retrieved from the grid database indicates that the selected client computer has failed a dependency with timestamp T such that CURTIME<T+X, a "yes" condition at block 316 ensues and the grid server evaluates the next task for assignment to candidate client computer as illustrated in block 317.

When there is a failure on record attributable to the selected client computer of one of the dependencies necessary to successfully execute the particular task at hand, and the failure data is not of a predetermined age X, then the grid server will evaluate the next task for assignment to the client candidate as illustrated in block 317.

When for each of the dependencies necessary to successfully execute the particular task at hand there is either no failure data on record or the failure data on record is of a predetermined age X, a "no" condition is returned by block 316 and the server selects the task 318 and allows the client computer to download that particular task as shown in block 311.

In another embodiment (not shown here), the dependency decision block returns a "no" condition when either none of the dependencies necessary to execute the particular task have failure data, or at least one of the dependencies necessary to successfully execute the particular task has failure data of a predetermined age X, and returns "yes" otherwise.

In block 319 the client computer checks to ensure that it has the particular dependency checking programs for the downloaded task. When the necessary dependency checking programs are not found to be present or are not the proper version, the client computer downloads the required dependency-checking programs from the grid server as shown in block 315.

Once the necessary dependency checking programs are present on the client computer, the client computer will execute the dependency checking programs 371, to determine whether the dependencies necessary for the task are satisfied as illustrated in block 372.

When the dependencies are satisfied on the client computer, the client computer executes the assigned task 373, and the results are returned to the server 325. When the server receives results of a successfully executed task from the client computer, the server marks the dependencies for this task as satisfied by this client with the timestamp T=CURTIME as shown in block 335.

The grid server will record each dependency necessary for the downloaded task as satisfied by the selected client machine as well as a timestamp that can be used to determine the age of the information.

In this particular embodiment this information is stored in the grid database as shown in block 330. This information is available for future recall for task assignment purposes.

When the dependencies are not satisfied on the client computer, the client computer returns an error message to the client server as shown in block 337. The error results specify which dependencies failed and the grid server marks each dependency as satisfied or failed by this client with timestamp T=CURTIME shown in block 336.

The grid server will record the unsatisfied dependencies necessary for the downloaded task as failed by the selected client machine as well as a timestamp that can be used to age the dependency information.

In this particular embodiment this information is stored in the grid database as shown in block 330. This information is available for future recall for task assignment purposes.

In yet another example or exemplary embodiment of the present invention, the grid server may only record and track failed dependencies for task assignment purposes. Specifically, when the dependencies are not satisfied by a client computer, the client computer returns an error message to the grid server. The error results specify which dependencies failed, and the grid server only marks the dependencies failed by this client computer with timestamp T=CURTIME shown in block 336.

The grid server will record only the unsatisfied dependencies necessary for the downloaded task as failed by the selected client machine as well as a timestamp that can be used to age the dependency information.

When the dependencies are satisfied on the client computer, the client computer executes the assigned task and may or may not indicate the results of a successful execution to the grid server. In the event that the client indicates successful results the grid server simply moves to the next task assignment without recording the results.

In the exemplary embodiment in which there is a successful execution of the task, and the client does not indicate a positive result, the grid server infers successful execution of the task by that client computer via the absence of returned failure data for that particular task.

Yet another aspect of the present invention is a system for tracking arbitrary task dependencies on a computer coupled to a grid network featuring a plurality of client computers coupled to at least one grid server computer such that at least one of the client computers can receive task from at least one grid server.

FIG. 4 illustrates a block diagram of an exemplary grid architecture 400 featuring multiple servers and multiple client computers.

This example embodiment features a plurality of grid servers 410, 450 and 460 coupled to a plurality of grid client computers forming a grid network such that at least one of the client computers coupled to a particular grid server can receive tasks from that grid server.

Grid server 410 is coupled to grid client computers A1-A4, 420, 421, 422 and 423. Grid server 450 is coupled to grid client computers B1-B3, 451, 452, 453. Grid server 460 is similarly coupled to grid client computers C1-C5, 461, 462, 463, 464 and 465.

Memory device 431 is coupled to the plurality of grid server computers 410, 450, and 460. The memory device can be any memory device that allows the various grid servers coupled thereto to write and retrieve data therefrom.

Each of the various grid servers of the plurality 410, 450, and 460, write to memory device 431 thereby building a common database of dependency information for each client machine coupled to the grid via the plurality of grid servers 410, 450 and 460.

While FIG. 4 illustrates the plurality of grid servers 410, 450 and 460 and their connection to various client computers at an instant in time, each of the plurality of grid servers 410, 450 and 460 are operatively coupled to, and able to distribute task assignments to any of the plurality of client computers 420, 421, 422, 423, 451, 452, 453, 461, 462, 463, 464 and 465 on demand.

A task for assignment may be received from another processor coupled to the grid (not shown) or created by a grid server in the plurality. Once the task is detected by a computer coupled to the grid, for example grid server 410, that grid server 410 individually evaluates a candidate task for a client computer, for example client computer 420, selected from the plurality of client computers coupled to that particular grid server 410, and identifies the dependencies necessary to perform the task on the selected client computer 420.

The selected client computer 420 downloads a task from the grid server 410 and downloads the dependency executables identified by the grid server 410 to check the dependencies on the selected client computer 420. The selected client computer 420 executes the downloaded dependency executables.

When the dependencies are satisfied, the selected client computer 420 executes the assigned task.

When at least one of the dependencies is checked and is not satisfied, the selected client computer 420 returns an error for the task to the grid server 410.

The grid server 410 records the particular dependencies that failed as not satisfied for the selected client computer 420, and a timestamp indicating when the dependency was checked in the memory device 431.

The grid server 410 assigns a task to a client computer 420 coupled to the grid if there are no recorded failed dependencies required for the task associated with the client computer 420 or the timestamp associated with a recorded dependency failure is of a predetermined age.

In a preferred embodiment, the selected client computer 420 returns the results of a successfully executed task to the grid server 410. When a task requiring the dependencies is executed on the selected client computer 420 the grid server 410 records on the memory device 431 each particular dependency as satisfied on the selected client computer 420. The recorded results feature a timestamp indicating when each particular dependency was satisfied for the selected client computer 420, which is when a task requiring the dependencies is executed on the selected client computer 420.

The grid server client computer relationship may vary from session to session. The term "session" is used here to mean the time during which a client maintains a connection to a grid server. At any instant of time a grid server may have N sessions, where N clients that currently have connections to that grid server.

For example, at a given time grid server 450 may maintain sessions with client computers 451, 452 and 453. At a later time, grid server 450 may maintain sessions with client computers 451, 452, 463 and 465.

In yet another embodiment each grid server of the plurality simultaneously evaluate a unique candidate task for a client computer selected from the plurality of client computers coupled to that particular grid server. Each grid server of the plurality identifies the dependencies necessary to perform a task on the selected client computer coupled to the particular grid server and the selected client computer downloads a task from the grid server coupled thereto. Each of the client computers downloads the particular dependency executables identified by the respective grid server to check the dependencies on itself and executes the downloaded dependency executables. When the dependencies are satisfied for a particular, the selected client computer executes the assigned task.

In yet another example or exemplary embodiment the disclosed invention may be contained within a computer program product featuring computer-usable medium having a computer usable program code for tracking arbitrary dependencies in a grid environment.

In this embodiment the computer program product features computer-usable program code for downloading a task to a computer coupled to the grid as well as computer-usable program code for identifying the dependencies necessary to perform the task.

A computer-usable program code for downloading the dependency executables to check the dependencies on the computer. In addition this embodiment employs computer-usable program code for executing the downloaded dependency executables on the computer.

When the dependencies are satisfied, the computer-usable program code executes the task on the computer, and returns the results of the task to the grid server. When at least one of the dependencies are checked and are not satisfied on the computer, the computer-usable program code returns an error for the task to the grid server, records the particular dependencies that failed as not satisfied for the computer, and records a timestamp indicating when the dependency was checked.

Also featured is computer-usable program code for assigning a task to a particular computer coupled to the grid if there are no recorded failed dependencies required for the task associated with the computer or the timestamp associated with a recorded dependency failure is of a predetermined age.

It will be understood that each block of the flowchart illustrations and block diagrams and combinations of those blocks can be implemented by computer program instructions and/or means.

Although specific example embodiments have been illustrated and described herein, those of ordinary skill in the art appreciate that other variations, aspects, or embodiments may be contemplated, and/or practiced without departing from the scope or the spirit of the appended claims.

The invention claimed is:

1. A method of tracking arbitrary task dependencies on computers in a grid environment, said method comprising:
   downloading a task to a computer coupled to said grid environment;
   identifying the dependencies necessary to perform said task;

downloading dependency executable on said computer, said dependency executable comprising computer programs to check for a presence of said dependencies on said computer;

executing said downloaded dependency executable on said computer;

when said dependencies are satisfied, executing said task on said computer, and returning results of said task to a grid server of said grid environment;

when said dependencies are checked and are not satisfied on said computer, returning an error for said task to said grid server, recording the dependencies that failed as not satisfied for said computer, recording a timestamp indicating when said dependencies were checked; and assigning a task to a particular computer coupled to said grid environment if one of:

there are no recorded failed dependencies required for said task associated with said particular computer, and if there is a recorded dependency failure and said timestamp associated with said recorded dependency failure is of a predetermined age;

recording each particular dependency satisfied for said computer, when a task requiring said dependencies is executed on said computer; and recording a timestamp indicating when each particular dependency was satisfied for said computer, when a task requiring said dependencies is executed on said computer.

2. The method of claim 1, wherein said downloaded dependency executable checks for a particular hardware based requirement.

3. The method of claim 1, wherein said downloaded dependency executable checks for a particular software based requirement.

4. The method of claim 1, wherein said downloaded dependency executable checks for a particular firmware based requirement.

5. A system for tracking arbitrary task dependencies on a computer coupled to a grid network, said system comprising:

a plurality of grid servers;

a plurality of client computers coupled to said plurality of grid servers such that said client computers can receive tasks from said plurality of servers; and a memory device coupled to said plurality of grid servers, wherein each of said plurality of grid servers evaluates a candidate task for each client computer selected from the plurality of client computers, and identifies the dependencies necessary to perform said candidate task on each of said selected client computer, wherein each of said selected client computer downloads a task from each of said plurality of grid servers, downloads dependency executable identified by each of said plurality of grid servers, said dependency executable comprising computer programs to check for a presence of said dependencies on each of said selected client computer, and executes said downloaded dependency executable, when said dependencies are satisfied, each of said selected client computer executes said downloaded task, when at least one of said dependencies are checked and are not satisfied, each of said selected client computer returns an error for said downloaded task to each of said plurality of grid servers, each of said plurality of grid servers records the dependencies that failed as not satisfied for each of said selected client computer, and a timestamp indicating when said dependencies were checked on said memory device, wherein each of said plurality of grid servers assigns a task to each of said client computers coupled to said grid if one of:

there are no recorded failed dependencies required for said task associated with each of said client computers, and if there is a recorded dependency failure and said timestamp associated with said recorded dependency failure is of a predetermined age, wherein each of said plurality of grid servers records the dependencies that failed as not satisfied for each of said selected client computer, and a timestamp indicating when said dependencies were checked on said memory device.

6. The system of claim 5, wherein each of said selected client computer returns results of an executed task to each of said plurality of grid servers.

7. The system of claim 6, wherein when a task requiring said dependencies is executed on a selected client computer a grid server records on said memory device each particular dependency as satisfied on said selected client computer.

8. The system of claim 7, further comprising recording a timestamp indicating when each particular dependency was satisfied for said selected client computer, when a task requiring said dependencies is executed on said selected client computer.

9. The system of claim 5, wherein said dependency executable checks for a particular hardware based requirement.

10. The system of claim 5, wherein said dependency executable checks for a particular software based requirement.

11. The system of claim 5, wherein said dependency executable checks for a particular firmware based requirement.

12. A computer program product comprising a non-transitory computer-usable medium having a computer usable program code for tracking arbitrary dependencies in a grid environment, said computer program product comprising:

computer-usable program code for downloading a task to a computer coupled to said grid environment;

computer-usable program code for identifying the dependencies necessary to perform said task;

computer-usable program code for downloading dependency executable on said computer, said dependency executable comprising computer programs to check for a presence of said dependencies on said computer;

computer-usable program code for executing said downloaded dependency executable on said computer;

when said dependencies are satisfied, computer-usable program code for executing said task on said computer, and computer-usable program code for returning results of said task to a grid server of said grid environment;

when said dependencies are checked and are not satisfied on said computer, computer-usable program code for returning an error for said task to said grid server, computer-usable program code for recording the dependencies that failed as not satisfied for said computer, computer-usable program code for recording a timestamp indicating when said dependencies were checked;

computer-usable program code for assigning a task to a particular computer coupled to said grid environment if one of:

there are no recorded failed dependencies required for said task associated with said computer, and if there is a recorded dependency failure and said timestamp associated with a recorded dependency failure is of a predetermined age;

computer-usable program code for recording each particular dependency satisfied for said computer, when a task requiring said dependencies is executed on said computer; and computer-usable program code for recording a timestamp indicating when each particular dependency was satisfied for said computer, when a task requiring said dependencies is executed on said computer.

* * * * *